United States Patent Office 3,356,567
Patented Dec. 5, 1967

3,356,567
METHOD AND COMPOSITION FOR INHIBITING THE MULTIPLICATION OF PLANT VIRUS USING 1-ACENAPHTHENOL
Hilary F. Goonewardene, Moorestown, N.J., assignor to Smith Kline & French Laboratories, Philadelphia, Pa., a corporation of Pennsylvania
No Drawing. Filed Jan. 15, 1965, Ser. No. 425,939
4 Claims. (Cl. 167—30)

This invention relates to the inhibition of the growth of viruses which attack plants, and more particularly to chemotherapy as applied to the control of plant viruses.

Viruses have been defined as submicroscopic infective entities that multiply only intracellularly and are potentially pathogenic. This definition summarizes the chief characteristic of viruses: small size, infectivity, host specificity, and complete dependence on the integrity of the host cell. The intimate relationship between the virus and the host cell is the most distinguishing feature of the virus, and necessitates a more subtle approach to the chemotherapy of viruses than to that of other infectious agents, such as bacteria and fungi.

Although no intelligent estimate of the damages caused by plant viruses can be made, the problem is now being recognized as serious. All kinds of plants whether annuals, biennials, perennials or trees become infected, e.g. beverage, forage, food and fibre, vegetables, tree and small fruit, floricultural and other cultivated crop plants.

With respect to viruses that infect flowering plants (Angio sperms) it is impossible to give an accurate figure but one textbook (2nd edition, Smith K. M., Textbook of Plant Virus Diseases (1957), Churchill, London) lists 300 viruses that are thought to be distinct.

To do great damage, particularly in annual crop, a virus must have an efficient method of spread as well as be able to be widely disseminated at an early stage of growth through the crop. This does occur with viruses such as sugar beet, curly top and yellows, barley yellow dwarf, cauliflower mosaic and tomato mosaic. Perennial plants, unlike animals through their antibody mechanism, do not recover from virus infection and thus infection is perpetuated in the parent as well as progeny.

In less severe cases, a virus disease may result in a decrease in yield and quality. It has been estimated that tobacco mosaic virus causes an annual loss of 40 million pounds of tobacco in the United States of America alone.

Although the losses of viruses are impressive, few control measures have been developed. Of the curative measures investigated, selective inactivation of a virus by the application of heat is generally not practical, and chemotherapy has been used to a small extent. Control of insect-transmitted virus diseases by control of the insect vectors although attractive, has not been too successful.

Other control measures of a negative nature are: destruction of infected plants (roguing); isolation from sources of infection; eradication of alternate hosts; use of non-infected healthy planting material; and use of disease-resistant varieties. Although these practices are adequate in certain cases, none is generally applicable and all have definite limitations.

It is an object of this invention to provide a chemical method of treating plants to inhibit the growth of viruses in the plants.

It is another object of this invention to provide a chemical method of treating plants to inhibit the growth and multiplication of systemic virus therein.

It is another object of this invention to provide chemical compositions for treating plants to inhibit viruses that contain nucleic acid of the ribose type and manifesting symptoms such as mosaic, lesions, and ringspot, enation, dwarfing, color changes, mottle, streaks, leaf form, epinasty, necrosis, shortening of internodes, tumors, variegation, phyllody changes in color, shape, size, texture, aspermy.

These and other objects of the invention will become apparent as the detailed description of the invention proceeds.

According to the method of this invention, the growth of virus in plants is inhibited by treating the plants with a chemical compound of the general formula:

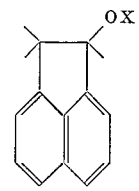

wherein X represents hydrogen, or an ester of an organic or inorganic acid, such as acetate, benzoate, nitrate, maleate, citrate, succinate, pyruvate, fumarate, tartrate or sulfate. Also included are compounds or complexes in which the solubility of the alcohol ($X=H$) in water, is enhanced. Such complexes are those of the alcohol with formaldehyde and sodium bisulfite. Also water soluble salts of the half esters, such as the sodium salt of the monosuccinate.

In effect, treating the plants with a salt of an active compound is treating the plant with the compound itself, since the salt upon contact with water releases the compound which is the active virus inhibitor.

These materials can be diluted with inert liquid or solid carriers to concentrations as low as about 1 to 2 parts per million or possibly lower and still be effective. The particular concentration used may vary depending on the activity of the particular anti-viral agents. Normally these agents will be effective in concentrations in the range of about 10 to 100,000 parts per million.

The virus-inhibiting chemical can be applied to the plants in a number of different ways, but it is preferred to apply it by spraying the plant foliage with a water solution or suspension of the chemical, in at least a sufficient concentration to inhibit virus growth in the plant. The chemical compound can be applied to the plant by spraying, dipping in the case of potted plants, dusting with the chemical dispersed in an inert powder, or by other conventional means, e.g., where the chemical is applied indirectly to the plant by treating the soil whereby the chemical is absorbed by the plant through its root system or by applying it to the foliage for absorption through the leaf surfaces.

An additional method of applying is by suspending small particles of the chemical in a stream of air or other gas, and spraying the plant with this suspension. The chemical can even be sprinkled on the plants in undiluted or powder form, if desired. In any event the invention does not lie in the particular method of application to the plant. Although these compounds are effective at low concentrations as stated above, higher concentrations will normally be used with the concentration being maintained below the level which will cause substantial phytotoxic injury of plants.

If the chemical is applied in water diluent and is readily soluble in water, of course no dispersant will be necessary, although a wetting agent may still be desirable for maximum effectiveness. If the chemical is not very soluble in water, an emulsifying agent may be required to keep it dispersed, e.g., alkylbenzenesulfonates, polyalkylene glycols, salts of sulfated long-chain alochols, sorbitan fatty acid ester, etc., and other emulsifying agents which can be used and which are listed, e.g., in the U.S. Department of Agriculture Bulletin No. E607. The active chemicals of the invention can also be applied, dissolved, or dispersed in organic solvents, e.g., low and high boiling solvents, provided the solvents themselves are substantially non-phytotoxic to the plants. If applied admixed with an inert pulverulent carrier, such carrier, as e.g., talc, bentonite, kieselguhr, precipitated silica, diatomaceous earth, etc. can be used.

The salt in some cases can have the advantage of getting the active compound into the plants more efficiently, and so promoting its antiviral action. This can be particularly true of some of the organic salts such as the one which will be illustratively mentioned below, since the organic salts will tend to hydrolyze more slowly than the inorganic salts mentioned. The following is a non-limiting list of the active salts useful in this invention: 1-acenaphthenol acetate, 1-acenaphthenol benzoate, 1-acenaphthenol nitrate, 1-acenaphthenol maleate, 1-acenaphthenol sulfate, tartrate, bitartarate, citrate, succinate, pyruvate, fumarate, and other readily prepared organic and inorganic salts.

1-acenaphthenol can be prepared by any of several methods which do not form a part of this invention. Typically, acenaphthene can be readily converted into 1-acenaphthenyl acetate with red lead and acetic acid. The acetate salt upon saponification yields crystalline 7-acenaphthenol in good yield. See Fieser et al., J. Am. Chem. Soc., 62 (1940).

PLANT VIRICIDE TEST PROCEDURE

*Nutrient solution*

|  | Gm./litre |
|---|---|
| Sucrose | 10.0 |
| $Ca(H_2PO_4)_2H_2O$ | 0.2 |
| Agar | 5.0 |

Autoclave for 15 minutes at 15 pounds pressure.

The chemical is dissolved in the suggested solvent (acetone or DMSO) and added to the sterile nutrient-agar solution so as to obtain serial dilutions of 10,000, 1000, 100 and 10 p.p.m. of the test chemical. Into each Petri dish is poured 20 ml. of the above nutrient agar solution. The Petri dishes are cooled for approximately two (2) hours. The solvent will dissipate from the medium in this period of cooling. For each dilution of test chemical, two Petri dishes are used—one of these contains chemical+nutrient agar solution, and the other contains nutrient agar solution only, this latter serves as the treatment check. The total number of Petri dishes used for each test chemical is therefore eight (8)—4 with chemical+nutrient agar solution, and 4 with nutrient agar only.

Small to medium size tobacco leaves, [*Nicotiana tabacum* (var. Samsun NN), which manifests symptoms of the test tobacco mosaic virus (TMV) as local lesions] are used as the test organism. The tobacco leaves are inoculated with TMV (method of preparation described below) using Carborundum as an abrasive. An alternative to Carborundum is the use of 1.5% celite in the inoculum. After inoculation the leaves are halved lengthwise (along the mid-vein) and one half is placed in a Petri dish containing the test chemical, and the other half serving as the control, is placed in a Petri dish containing nutrient agar only. The Petri dishes are incubated at 24° C. for 2 to 3 days after which the leaves are examined for lesion development and other visible physiological disturbances, e.g., phytotoxicity. An accurate count of the lesions present and other pertinent observations are made.

*Method of preparation of inoculum*

Approximately 4 grams of young leaves are selected from a TMV infected tobacco plant. The leaves are ground in a mortar containing 5 ml. of distilled water. The resulting sap is strained through cheesecloth and then diluted 1:10 with distilled water. The resulting inoculum is applied to Carborundum dusted leaves with a ¾" artist brush (fine hair). If one desires to eliminate leaf dusting with Carborundum, celite may be added to the sap, and the resulting mixture "painted" on the leaves. Any one area of a leaf is "painted" with a single stroke with the brush from the mid-vein to the margins.

1 acenaphthenol (SK & F 22,377) was subjected to testing as a viricide in the foregoing procedure for local lesion determination. The concentrations of test chemical used, and the conditions are chosen somewhat arbitrarily, and may not represent conditions for maximum effectiveness. The results of this test are summarized in the following table.

TABLE 1.—INHIBITION OF LOCAL LESION PRODUCTION BY SK & F NO. 22,377

| Compound | Part per Million | Local Lesion Count |
|---|---|---|
| SK & F 22,377 | 10 | 28 |
|  | 100 | 0 |
|  | 1000 | 0 |
|  | *10,000 | 0 |
| Control (no chemical) | 10 | 50 |
|  | 100 | 46 |
|  | 1000 | 85 |
|  | 10,000 | 30 |

* Phytotoxic.

The data described above demonstrate the high and unexpected activity of the chemical compound of the invention in inhibiting the growth of plant viruses. It has been shown experimentally that tobacco mosaic virus is inhibited by the present method, and since many viruses are quite similar chemically, e.g., RNA type viruses, it would be expected that a number of viruses would be controlled by the method. For example, tobacco mosaic virus is reported (Textbook of Biochemistry by Harrow, B., fifth edition, 1950, pp. 79–84) to be a conjugated protein containing about 95% protein and 5% ribo-nucleic acid; bushy stunt virus appears to contain 83% protein and 17% of ribo-nucleic acid, and tobacco ring spot virus contains 60% protein and 40% ribo-nucleic acid.

Although the invention has been described in terms of specified examples which are set forth in considerable detail, it should be understood that this is by way of illustration only, and that the invention is not necessarily limited thereto. Alternative embodiments will become apparent to those skilled in the art, in view of the disclosure. Particularly, it should be recognized that the claimed compounds and the salts thereof are equivalent, since a salt on contact with water will hydrolyze releasing the compound itself, which is the active antiviral agent, so actually treating the plants with the salt is in effect treating the plants with the compound itself. Accordingly, modifications are contemplated which can be made without departing from the spirit of the described invention.

What is claimed is:

1. The method of inhibiting the multiplication of plant viruses selected from the group consisting of tobacco mosaic virus, bushy stunt virus, and tobacco ring spot virus comprising applying to living plants, a virus-growth inhibiting quantity of a compound selected from the group consisting of 1-acenaphthenol and an ester thereof selected from the group consisting of acetate, benzoate, nitrate, maleate, sulfate, citrate, succinate, pyruvate, fumarate and tartrate.

2. The method of claim 1 wherein said plants are tobacco plants and said virus is tobacco mosaic virus.

3. The method of claim 1 wherein said compound is 1-acenaphthenol.

4. A composition for the inhibition and control of plant viruses selected from the group consisting of tobacco mosaic virus, bushy stunt virus, and tobacco ring spot virus in the form of a liquid suspension comprising a compound selected from the group consisting of 1-acenapthenol and its esters consisting of the acetate, benzoate, nitrate, maleate, citrate, succinate, pyruvate, fumarate and tartrate, a liquid diluent, an emulsifying agent, and an inert pulverulent carrier, said compound being present in said composition in the range of 10 to 100,000 parts per million.

References Cited

Chemical Abstracts 59: 5092h (1963).
Chemical Abstracts 51: 13827i (1957).

ALBERT T. MEYERS, *Primary Examiner.*

JULIAN S. LEVITT, SAM ROSEN, *Examiners.*

J. D. GOLDBERG, *Assistant Examiner.*